June 9, 1964  J. B. WADE  3,136,558
FLUID SEAL AND MOUNTING MEANS
Filed Jan. 26, 1959  2 Sheets-Sheet 1
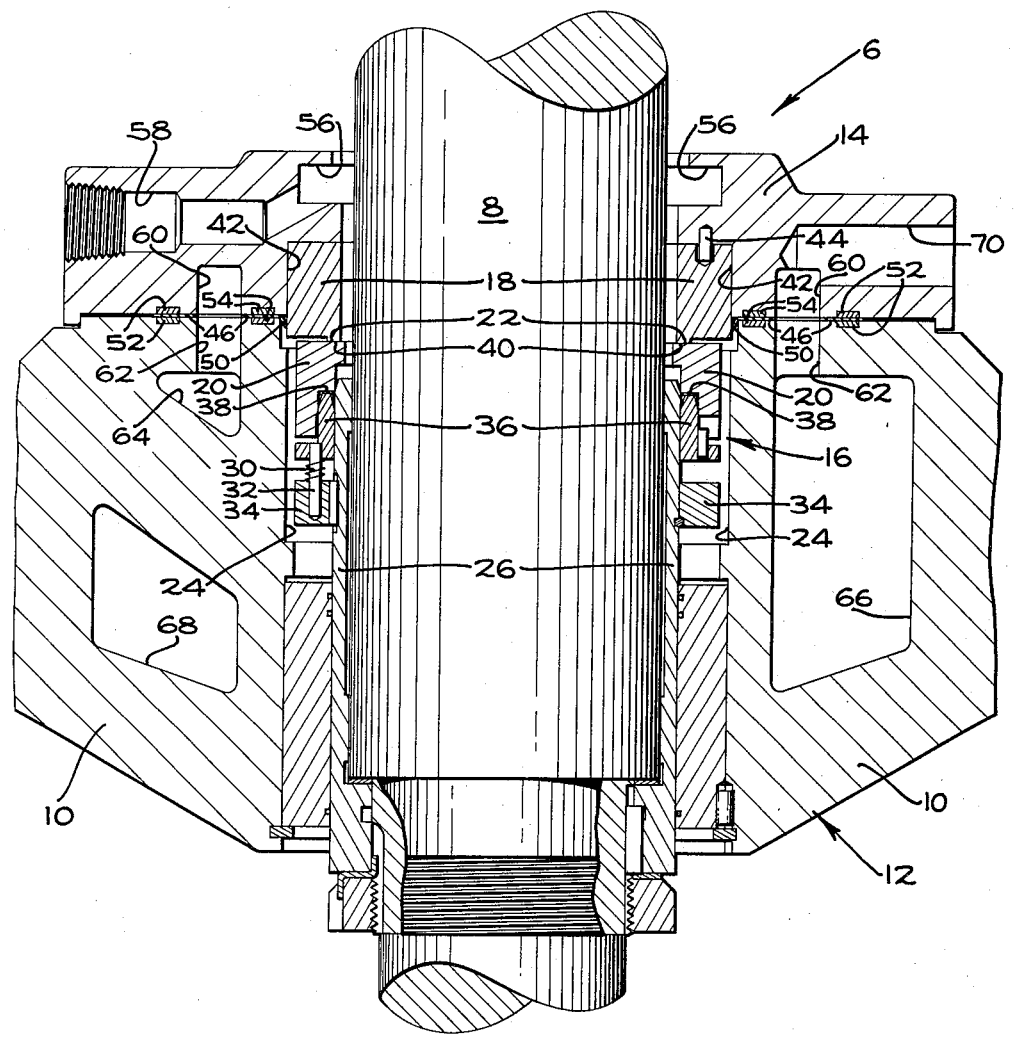
FIG_1
INVENTOR
JOHN B. WADE
BY *Hans G. Hoffmeister*
ATTORNEY

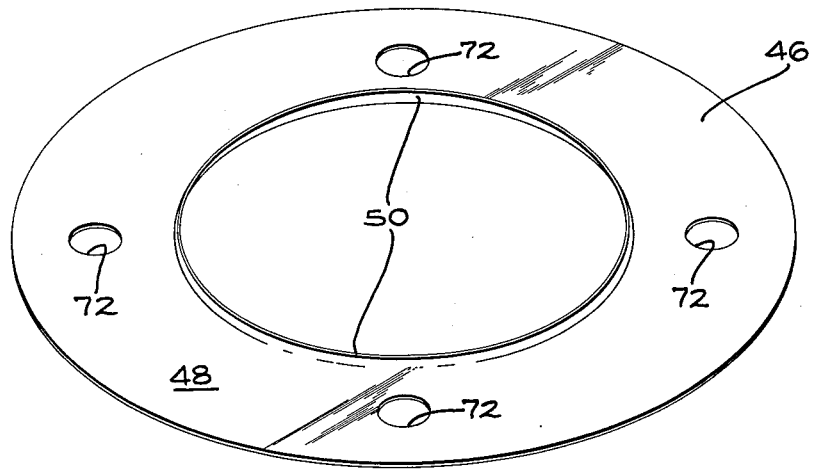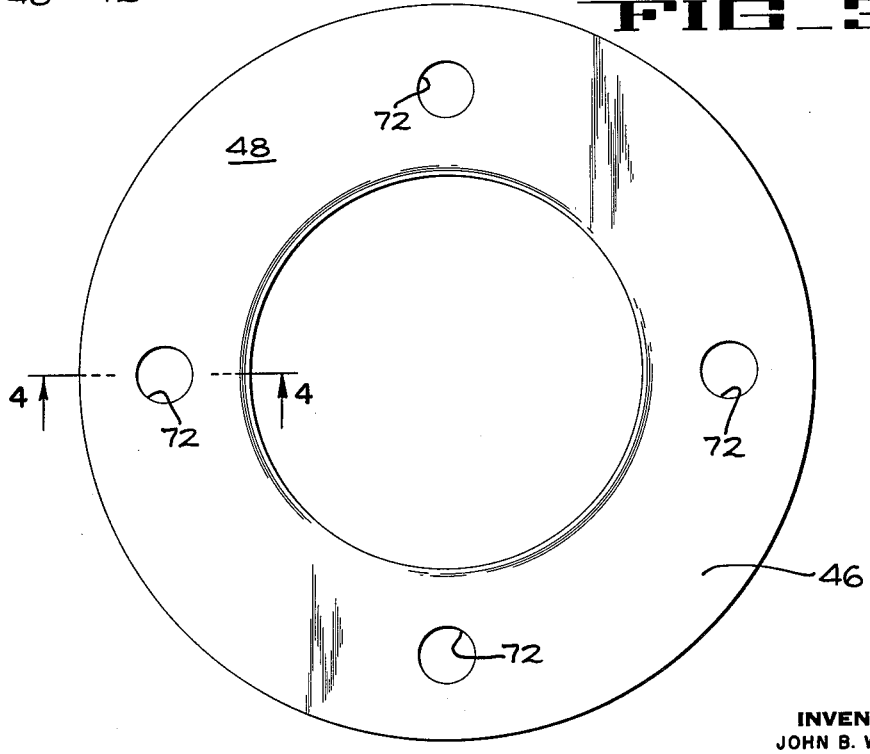

United States Patent Office 3,136,558
Patented June 9, 1964

3,136,558
FLUID SEAL AND MOUNTING MEANS
John B. Wade, Arcadia, Calif., assignor to FMC
Corporation, a corporation of Delaware
Filed Jan. 26, 1959, Ser. No. 788,979
1 Claim. (Cl. 277—81)

The present invention relates to fluid seals, and more particularly to seals for the prevention of fluid leakage in pumps designed for the circulation of fluid under conditions of extremely high temperature and pressure, such as, for example, the conditions encountered in a circulating pump employed in conjunction with an atomic reactor.

A mechanical seal usually is employed to block leakage along a shaft mounted for rotation within a stationary housing, such a seal including a pair of elements, one being associated with the housing and being stationary, and the other being rotatable with the shaft.

It is, of course, also necessary to prevent the leakage of fluid between the housing and the stationary element of the mechanical seal, particularly in circulating pumps for an atomic reactor, which present an unusual problem since the water pumped thereby may reach a pressure as high as 2,000 p.s.i., and a temperature as high as 500° C. Furthermore, a seal designed for such service must withstand the radio-activity usually present in the areas in which such pumps are employed.

A factor to be considered in the design of mechanical seals in general is the difficulty often encountered in the assembling and disassembling of the seal construction. Since it is desirable that the interface between the stationary and rotatable elements of the seal be maintained optically flat, said elements must be handled in such a manner as to avoid distortion of their operating faces. Breakage of the seal elements is also a danger to be avoided.

It is therefore an object of the present invention to provide an improved mechanical seal.

Another object of the invention is to provide a mechanical seal adapted to withstand the extremely high temperature and pressure conditions and the radio-activity likely to be encountered in the pumping of atomic reactor fluids.

Another object of the present invention is to provide a mechanical seal, the elements of which can be assembled and disassembled without danger of distortion of the operating faces thereof.

Another object of the invention is to provide a mechanical seal, the elements of which can be assembled and disassembled without danger of breakage thereof.

Another object of the invention is to provide special means for sealing between the stationary element of a mechanical seal and the mounting structure therefor.

Another object of the invention is to provide a sealing member for the stationary element of a mechanical seal, which sealing member offers a resistance to passage of the fluid confined thereby which increases in response to rise in the hydrostatic pressure of such fluid.

These and other objects of the invention will become apparent from the following description thereof, taken in conjunction with the accompanying drawings in which:

FIG. 1 is a horizontal section through part of a pump employing the fluid seal of the present invention.

FIG. 2 is an enlarged perspective of the seal member of the invention viewed from the pressure side thereof.

FIG. 3 is a view of the other side of the seal member of FIG. 2.

FIG. 4 is a fragmentary section along lines 4—4 of FIG. 3.

FIGURE 1 of the drawings illustrates a part of a pump 6 for an atomic reactor, including a shaft 8 extending through a wall 10 of the pump housing 12 and a cap 14 removably secured to the housing wall 10 as by a plurality of cap screws (not shown). A mechanical seal 16 is provided for preventing escape from within the housing 12 of the fluid (not shown) being pumped. The mechanical seal construction 16 includes a stationary seal ring 18 that is mounted in the cap 14 and a rotatable seal ring 20 that slidably engages the stationary seal ring 18 at an interface 22. The rotatable seal ring 20 is disposed within the opening 24 in the housing wall 10 through which the shaft 8 extends, the opening 24 being considerably larger than the seal ring 20 so that the pump housing does not interfere with rotation of the seal ring 20 or with movement of the same in either axial direction relative to the shaft.

The construction of the mechanical seal 16 and the manner in which the rotary seal ring 20 thereof is mounted are well known and do not constitute any part of the present invention and therefore need not be fully described herein. For the purposes of the present disclosure however, it should be explained that the rotatable seal ring 20 is mounted upon a sleeve 26 so secured to the shaft 8 that leakage between shaft and sleeve is precluded, and that the rotatable seal ring 20 is constantly pressed into fluid sealing engagement with the stationary seal ring 18 at the interface 22 by a plurality of springs 30 through each of which a pin 32 extends. A collar 34 is rigidly secured to the sleeve 26 and the pins 32 connect the collar 34 to a collar 36 in a manner permitting the springs 30 to move the collar 36 axially on the sleeve so that the urge of the springs 30 is transmitted to the seal ring 20 but preventing rotary movement of the collar 36 relative to the shaft. Moreover, the collar 36 fits the sleeve 26 in a manner precluding leakage therebetween and the collar 36 is provided with an annular sealing member 38 of cup-shaped cross section that provides a fluid-tight seal between the collar 36 and the ring 20. It will be understood, therefore, that leakage of fluid from within the pump housing 12 cannot occur along the shaft 8 inside the rotatable seal ring 20 and that the function of the mechanical seal 16 is to prevent escape of fluid past the outer periphery of the rotary seal ring 20.

In order to assure efficient fluid sealing engagement between the rotatable seal ring 20 and the stationary seal ring 18 at their interface 22, the contacting surfaces of the rings 18 and 20 at the interface 22 should be optically flat. The present invention is concerned with a means for, and a manner of, mounting the stationary seal ring 18 within the cap 14 that will assure preservation of this characteristic of the surface 40 of the seal ring 18 at the interface 22. Heretofore, it has been customary to mount the stationary seal ring 18 within the cap 14 by pressing the ring into a recess 42 in the inner face of the cap 14, the parts being so proportioned that a press fit is established between ring and cap. It is common practice, however, to employ a graphite ring for the stationary seal ring 18 and, as is well-known, such a ring is highly frangible. Therefore, difficulty has usually been encountered in pressing the ring 18 into the recess 42 without fracturing the ring, or at least so distorting the ring 18 that its seal-establishing surface 40 is distorted to an extent destroying the sealing efficiency thereof. The present invention deals with the manner of mounting the stationary seal ring 18 so as to avoid these contingencies.

In accordance with the present invention, the recess or socket 42 in the cap 14 is dimensioned to permit the stationary seal ring to be slipped easily thereinto without having to use such force as would be apt to fracture the ring or to injure the flat sealing surface 40. For example, in the case of a pump shaft 8 of 4" diameter, a clearance of the order of 0.005" on the diameter has been found to be satisfactory. The seal ring 18 is thus relatively loosely seated within its socket 42. A dowel pin 44 interconnects the seal ring 18 and the cap 14 to prevent the seal ring 18 from turning. The present invention likewise provides a seal member 46 for sealing against fluid leakage between the stationary seal ring 18 and the cap 14.

The seal member 46 (see also FIGS. 2, 3 and 4) is constructed of metal such as stainless steel, or of a metal alloy, preferably approximately .008 in. thick, and is in the form of a flat, annular seal ring 48 clamped between the contiguous surfaces of the housing wall 10 and the cap 14. Projecting inward from the inner circumferential edge of the seal ring 48 is a frusto-conical sealing flange 50, the base, or larger circumference of which is in contact with the inner face of the cap 14, and the inner circumference of which is in tight engagement with the outer circumferential surface of the stationary seal ring 18. A first pair of axially aligned gaskets 52 provide a seal between the opposite surfaces of the seal ring 48 and the adjacent surfaces of the housing wall 10 and cap 14, respectively, said gaskets being located near the outer circumferential edge of the seal ring 48. A second pair of gaskets 54 similarly provide a seal near the inner circumferential edge of the seal ring 48.

An annular chamber 56 (FIG. 1) formed within the cap 14 axially outward of the seal ring 18 and surrounding the shaft 8, together with an outlet passageway 58 communicating therewith, serves to drain off any fluid which might manage to leak past the above described seals. A chamber 60 in the cap 14 and a series of interconnected chambers 62, 64, 66, and 68 in the housing wall 10 are in communication with each other and with an inlet passageway (not shown) and an outlet passageway 70 in the cap 14 for the circulation of a coolant. The coolant makes possible operation of the seal provided by the seal member 46 at a relatively low temperature as compared to that of the fluid being pumped. The seal ring 48 extends between chambers 60 and 62, and consequently is provided with a suitable number of angularly spaced apertures 72 for passage of the coolant, four such apertures being shown (FIGS. 2 and 3).

The seal member 46 comes into operation when the pump driven by the shaft 8 is active for the pumping of fluid, and fluid tends to leak along the shaft. Such fluid, if under sufficient pressure, would proceed along the outer surface of sleeve 26 and into the hollow areas in the housing wall 10 adjacent the collar 34. Further passage of such fluid past the inner circumference of the rotary seal ring 20 and past the interface 22 between the seal rings 18 and 20 is blocked as hereinbefore explained and leakage past the outer circumference of the stationary seal ring 18 is prevented by the gaskets 52 and 54, and by the seal member 46. The latter serves primarily to prevent leakage of fluid along the outer circumferential surface and the outer end surface of the stationary seal ring 18 which, as has been described above, fits loosely in the socket 42 in cap 14. As a result of the flexibility of the material of which the seal member 46 is constructed, the flange 50 will be forced tight against the seal ring 18 by any fluid under high pressure which reaches the seal member 46. The necessary seal will thus be established.

Further, the pressure exerted on the seal ring 18 by the frusto-conical flange portion of seal member 46 is effective to retain the seal ring within the recess or socket 42 in the mounting cap 14.

The loose fit of the stationary seal ring 18 made permissible by the provision of the seal member 46 enables insertion of said seal ring within the recess 42 without danger of distortion of the sealing face 40. Removal of the seal ring 18 without danger of breakage thereof is likewise enabled. If radioactive fluids are being pumped, the metal or metal alloy employed for construction of the seal member 46 will avoid such deterioration as would occur if a material less resistant to radioactivity were employed.

While the present invention has been described with reference to a particular seal arrangement, it will be understood that use thereof in conjunction with the other seal arrangements is practicable. It will be further understood that while a particular embodiment of the present invention has been shown and described, the device is capable of modification and variation without departing from the principles of the invention and that the scope of the invention should be limited only by the scope and proper interpretation of the claim appended hereto.

The invention having thus been described, what is believed to be new and desired to be protected by Letters Patent is:

In a sealing assembly for a rotatable shaft which projects through a housing, the combination which comprises a frangible seal ring encompassing said shaft, mounting means for said frangible seal ring having a recess for slidably receiving said seal ring therein with a portion of said seal ring projecting therefrom, said mounting means being located adjacent said housing, and a metallic seal ring sealing member including a flat ring portion encompassing said seal ring and clamped between said mounting means and said housing, and including a flexible frusto-conical flange portion converging away from said mounting means and in contact at its base with said mounting means and having the edge opposite its base in supporting sealing engagement with the peripheral surface of said frangible seal ring to retain said seal ring within said recess and to provide a fluid tight seal between said seal ring and said mounting means.

References Cited in the file of this patent

UNITED STATES PATENTS

| | | |
|---|---|---|
| 739,859 | Halsey | Sept. 29, 1903 |
| 1,200,966 | Minning | Oct. 10, 1916 |
| 2,067,540 | Nanos et al. | Jan. 12, 1937 |
| 2,199,761 | Shenton | May 7, 1940 |
| 2,297,302 | Hornschuck | Sept. 29, 1942 |
| 2,362,436 | Stratford | Nov. 7, 1944 |
| 2,444,249 | Estey | June 29, 1948 |
| 2,693,376 | Wurzburger | Nov. 2, 1954 |
| 2,856,210 | Schoenrock | Oct. 14, 1958 |
| 2,886,352 | Krellner | May 12, 1959 |

FOREIGN PATENTS

| | | |
|---|---|---|
| 580,658 | Great Britain | Sept. 16, 1946 |